United States Patent
Kaslon

(10) Patent No.: US 6,542,442 B2
(45) Date of Patent: Apr. 1, 2003

(54) SCENT EMITTING DEVICE

(76) Inventor: David A. Kaslon, RR2, Box 10E, Ord, NE (US) 68862

( * ) Notice: Subject to any disclaimer, the term of this patent is extended or adjusted under 35 U.S.C. 154(b) by 0 days.

(21) Appl. No.: 09/848,275

(22) Filed: May 4, 2001

(65) Prior Publication Data

US 2001/0048641 A1 Dec. 6, 2001

Related U.S. Application Data

(60) Provisional application No. 60/208,069, filed on May 31, 2000.

(51) Int. Cl.[7] ............................................. G11B 13/00
(52) U.S. Cl. .......................... 369/2; 422/116; 360/132
(58) Field of Search ............................... 369/2; 360/132

(56) References Cited

U.S. PATENT DOCUMENTS

| | | | |
|---|---|---|---|
| 4,556,539 A | | 12/1985 | Spector |
| 4,629,604 A | | 12/1986 | Spector |
| 4,771,344 A | * | 9/1988 | Fall caro et al. ............. 358/335 |
| 4,905,112 A | | 2/1990 | Rhodes |
| 5,069,876 A | | 12/1991 | Oshinsky |
| 5,097,375 A | * | 3/1992 | Khan .......................... 360/132 |
| 5,398,070 A | * | 3/1995 | Lee ............................ 348/553 |
| 5,565,148 A | | 10/1996 | Pendergrass, Jr. |
| 5,591,409 A | * | 1/1997 | Watkins ....................... 422/110 |
| 5,610,674 A | | 3/1997 | Martin |
| 5,724,256 A | * | 3/1998 | Lee et al. .................... 364/502 |
| 5,832,320 A | * | 11/1998 | Wittek ........................ 396/106 |
| 5,938,640 A | * | 8/1999 | Maget et al. ................. 604/145 |
| 5,949,522 A | | 9/1999 | Manne |
| 5,972,290 A | * | 10/1999 | De Sousa ....................... 422/5 |
| 6,090,344 A | * | 7/2000 | Yamauchi et al. .............. 422/4 |
| 6,136,277 A | * | 10/2000 | Nardini ....................... 422/124 |
| 6,231,032 B1 | * | 5/2001 | Ivey, Jr. ....................... 261/26 |
| 6,234,455 B1 | * | 5/2001 | Wittek ......................... 261/30 |
| 6,328,287 B2 | * | 12/2001 | Wittek ......................... 261/30 |
| 6,338,818 B2 | * | 1/2002 | Budman ........................ 422/4 |

FOREIGN PATENT DOCUMENTS

| WO | 99/08174 | 2/1999 |
|---|---|---|
| WO | 99/38102 | 7/1999 |

* cited by examiner

Primary Examiner—Aristotelis M Psitos
(74) Attorney, Agent, or Firm—Richard C. Litman

(57) ABSTRACT

A scent emitting device incorporates a specially adapted prerecorded playback cassette and playback device, with the prerecorded cassette including one or more scent emitting cartridges and the playback device including scent dispersal apparatus. The recording includes inaudible and/or invisible signals which trigger the scent production mechanism of the player to actuate the scent emitting apparatus. Upon receiving an appropriate signal from the recording, the apparatus actuates a small pump which withdraws a small quantity of the desired scent from the appropriate scent cartridge and sprays the selected scent into a plenum, whereupon it is vaporized and dispersed into the ambient air by a fan or other suitable device. Each prerecorded cassette may include one or more (preferably several) scent cartridges, with the player preferably including a series of syringes for automatically penetrating each cartridge of the cassette as it is inserted into the player.

17 Claims, 4 Drawing Sheets

SCENT EMITTING DEVICE

CROSS-REFERENCE TO RELATED APPLICATION

This application claims the benefit of U.S. Provisional Patent Application Ser. No. 60/208,069, filed May 31, 2000.

BACKGROUND OF THE INVENTION

1. Field of the Invention

The present invention relates generally to systems and apparatus for emitting a scent to an area, and more specifically to a device utilizing a specially adapted compact disc, digital video disc, or other playback device which includes one or more scent cartridges and means for triggering the scent(s) according to the operation of the prerecorded playback medium. The device provides a scent(s) corresponding to the message (music, story, movie, information, etc.) of the playback medium, thereby providing a more all encompassing sensory effect.

2. Description of the Related Art

The advance of electronics has led to a corresponding advance in the recorded entertainment field as well. From the early development of recorded sound to the development of motion picture film, the entertainment industry has developed ways for stimulating the auditory and visual senses of persons. Later advances have led to even greater realism (stereo sound, color and wide screen movies, etc.), with some efforts being made toward the development of tactile sensory stimulation even more recently.

Ideally, an entertainment or informational system might stimulate the four most important senses of sight, hearing, touch, and smell. While great strides have been made toward providing realism for visual and audio effects, very little has been accomplished toward providing scents to stimulate the olfactory senses, particularly in combination with visual and audio effects. While some efforts have been made to provide realistic scents in certain limited training environments (e.g., advanced flight simulators which include the smell of burning wiring to add realism to a simulated electrical problem), such devices are exceedingly complex and very narrow in their scope; they cannot provide a plurality of different scents in accordance with recorded audio or visual entertainment or the like.

Accordingly, a need will be seen for a device which emits one or more scents in accordance with the sound or visual output of a prerecorded audio and/or visual medium (e.g., tape, compact disc or CD, digital video disc or DVD, etc.) which has been adapted to provide olfactory stimulation as well. The present invention comprises a specially adapted recording medium containing one or more scent emitting cartridges. A specially adapted player unit accepts the recording and triggers the emission of the scent(s) during the play of the recording according to signals prerecorded on the recording, thereby providing a realistic entertainment experience involving visual, auditory, and olfactory senses.

A discussion of the related art of which the present inventor is aware and its differences and distinctions from the present invention, is provided below.

U.S. Pat. No. 4,556,539 issued on Dec. 3, 1985 to Donald Spector, titled "Disc-Playing Aroma Generator," describes a scent impregnated disc sandwiched between a pair of plastic sheets. Air is forced between the sheets to evaporate the scent and distribute it into the ambient air. Spector provides only a scent emitting device, with no means for tying it into or triggering its operation from an audio or visual player of any type. Further, no means of producing more than a single scent is provided by Spector, whereas the present invention may provide a series of different scents simultaneously or sequentially in a single operation, in combination with audio and/or visual entertainment.

U.S. Pat. No. 4,629,604 issued on Dec. 16, 1986 to Donald Spector, titled "Multi-Aroma Cartridge Player," describes a container having a series of scent impregnated compartments therein. The container is placed within a playing device which has a series of heating elements which are in registry with the scent impregnated compartments of the container. Various scents are emitted as various heating elements are activated to evaporate some of the scent in the corresponding compartment. While Spector states that his device may be synchronized with a video tape or movie presentation, the actuation of his system by heating elements is relatively slow in comparison to the present pressurized system, and would be difficult to synchronize.

U.S. Pat. No. 4,905,112 issued on Feb. 27, 1990 to Steven W. Rhodes, titled "Scent Cassette," describes a tape cassette having a perforated compartment into which a block of scent emitting material is placed. The cassette includes small fan blades or other means driven by the cassette spools, for drawing air through the cassette and past the scent emitting material. Rhodes provides only a single scent, rather than the multiple scents possible with the present invention, and does not provide any means of synchronizing the scent emission with any particular portion of the audio tape, as provided by the present invention. Moreover, Rhodes does not provide any means of producing a scent in conjunction with a video display of any sort, as provided by the present invention in combination with a DVD device.

U.S. Pat. No. 5,069,876 issued on Dec. 3, 1991 to Candace Oshinsky, titled "Combined Scent And Audio Point Of Sale Display Unit," describes a device having one or more scent cartridges activated in conjunction with an audio tape. Where more than a single cartridge is provided, only a single scent may be emitted at one time, due to the manual selector switch means of the Oshinsky device. In contrast, the present scent emitting invention may emit a series of scents simultaneously, if so desired, with the scent emission triggered automatically by an inaudible digital signal(s) from the recording as it plays. Moreover, the Oshinsky device uses a different principle than the present scent emitting invention, with Oshinsky using a pneumatic pump to pass air over the scent cartridge(s) rather than injecting the scent into the air.

U.S. Pat. No. 5,565,148 issued on Oct. 15, 1996 to Daniel B. Pendergrass, titled "Device For Selectively Providing A Multiplicity Of Aromas," describes a device having a multicompartmented cylinder, with each compartment containing a scent producing insert. The scent cylinders are arranged concentrically about the central axis of the cylinder, in the manner of the cylinder of a revolver type pistol. The cylinder is selectively rotated to position a single scent cartridge in line with an air source, which blows through the volatile scent cartridge to expel the scent from the device. The Pendergrass device is only capable of emitting a single scent at a time, whereas the present invention can emit multiple scents simultaneously, if so desired. Moreover, the present invention utilizes scent cartridges containing a liquid scent material which is injected into a plenum as a fine mist or vapor, unlike the means used with the Pendergrass scent apparatus.

U.S. Pat. No. 5,610,674 issued on Mar. 11, 1997 to David A. Martin, titled "Precision Fragrance Dispenser Apparatus," describes a device in which the scent is provided only to a single user via a tube, rather than to the ambient air in a room or the like, as in the case of the present invention. The Martin apparatus also includes breath sensing means, which causes the scent to be delivered in synchronization with breathing. This additional complexity is unnecessary with the present invention, which delivers the scent to the air in the room, rather than to an individual user.

U.S. Pat. No. 5,949,522 issued on Sep. 7, 1999 to Joseph S. Manne, titled "Multimedia Linked Scent Delivery System," describes a system using tubes to conduct the scent(s) to the nose of the user, rather than into the ambient air, as in the case of the present invention. Aside from the different means of supplying the scent to the user, the Manne system is essentially opposite the present system, as Manne provides air under pressure upstream of the scent holders and blows the air past the scents in the holders, rather than injecting the scents into the air downstream of a fan, as in the present invention. Moreover, while Manne discusses means for synchronizing scent output with audio and/or video recordings, he does not provide any means for using a CD and/or DVD audio and/or video disc to trigger the scent output, as provided by the present invention.

PCT Patent Publication No. 99/08174 published on Feb. 18, 1999 to the Illinois Institute of Technology, titled "Apparatus For Generating Odor Upon Electronic Signal Demand," describes a device having a scent impregnated disc in which the scent material is heated for vaporization. The scent is then distributed through the ambient air. With only a single disc, the device can only distribute a single scent, as opposed to the multiple scents which may be provided simultaneously by the present invention. The device of the PCT '174 Patent Publication is thus more closely related to the scent emitting disc of the '539 U.S. Patent to Spector, discussed further above, than to the present scent emitting invention.

Finally, PCT Patent Publication No. 99/38,102 published on Jul. 29, 1999 to Bala Narayanaswamy, titled "Olfactory Emitting System" describes a system in which one or more pressurized scented gases are provided, with actuation of valves for releasing the gases being triggered by certain predetermined words or phrases detected by appropriate voice recognition means. The Narayanaswamy system is particularly adapted for producing a scent at a remotely located point from the master program, with the remote point having appropriate scent producing means. Thus, Narayanaswamy is directed more to Internet, cable, or broadcast use than to the provision of a scent(s) for persons listening to music or viewing a video using a single cohesive system, as provided by the present invention.

None of the above inventions and patents, either singly or in combination, is seen to describe the instant invention as claimed.

SUMMARY OF THE INVENTION

The present invention comprises a scent emitting device which provides one or more scents to the ambient air within a room or the like, with the scent output being triggered by a playback device (preferably a compact disc or CD player or digital video disc or DVD player, but adaptable to other recorded media and playback devices as well) in accordance with the prerecorded audio or video program being played. The present invention provides much greater realism for such programs, particularly video programs, by simultaneously stimulating three of the five senses (i.e., sight, sound, and smell).

The present system operates by means of an inaudible and/or invisible signal which is provided from the CD, DVD, or other prerecorded playback medium which triggers the scent dispensing apparatus in a specially adapted player. When the apparatus is triggered, a small pump is actuated to inject a small amount of a scent producing substance into the plenum of the device, whereupon a fan or the like blows the vaporized scent into the ambient air of the room. The present device may include a series of scent cartridges and corresponding pump mechanisms, in order to dispense a series of scents either sequentially or simultaneously, as desired.

Accordingly, it is a principal object of the invention to provide an improved scent emitting device for dispensing one or more scents into the ambient air of an enclosed area.

It is another object of the invention to provide an improved scent emitting device which scent emission is triggered by inaudible and/or invisible signals provided from a CD or DVD disc by means of a specially adapted CD or DVD player.

It is a further object of the invention to provide an improved scent emitting device in which signals actuate one or more pump devices which inject a scent compound into a plenum for evaporation and distribution to the ambient air by means of a fan or the like.

An additional object of the invention is to provide an improved scent emitting device which may emit a plurality of scents either sequentially or simultaneously, according to programming.

Still another object of the invention is to provide an improved scent emitting device in which scent emitting cartridges are easily replaceable as desired or as required.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a scent emitting device in combination with a playback device for playing prerecorded audio and/or video recordings. The device enables a person enjoying a prerecorded program or the like, to experience stimulation of three of the five senses simultaneously (i.e., sight, in the case of a video recording, sound, and smell). The present invention is adaptable to various types of prerecorded media and associated playback devices, e.g. audio and video tapes, but is particularly well suited for incorporation with compact disc (CD) recordings and players and digital video disc (DVD) recordings and players.

Figure 1:
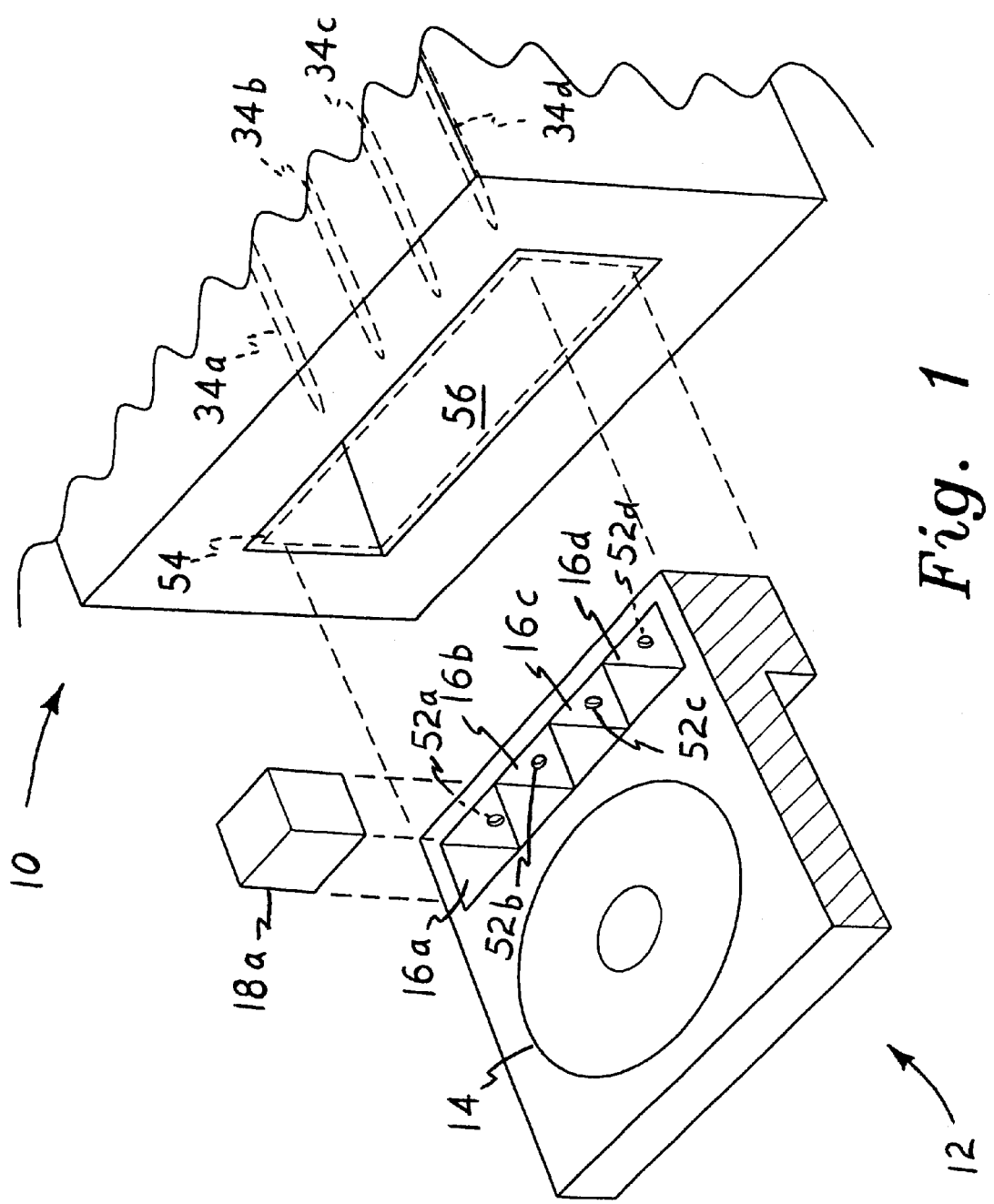
FIG. 1 is a perspective view of a prerecorded medium cassette and scent cartridge assembly of the present invention, showing its insertion into a specially adapted player.

FIG. 1 illustrates an exemplary embodiment of the present invention, basically comprising a specially adapted playback device or machine 10 and prerecorded cassette 12 for play therein. The recording 14 of the cassette 12 is preferably a prerecorded digital disc of some sort, such as an audio compact disc (CD) or digital video disc (DVD), although the present invention is adaptable to other types of recording and playback media as well, e.g., audio and video tape recordings and playback devices, etc.

The cassette 12 is configured to hold at least one scent cartridge therewith, and preferably includes a series of several scent cartridge compartments, e.g., 16a through 16d. A corresponding series of scent cartridges 18a through 18d (the remaining cartridges 18b through 18d are shown in FIG. 2 of the drawings) are removably installable in their corresponding compartments 16a through 16d.

Figure 3:
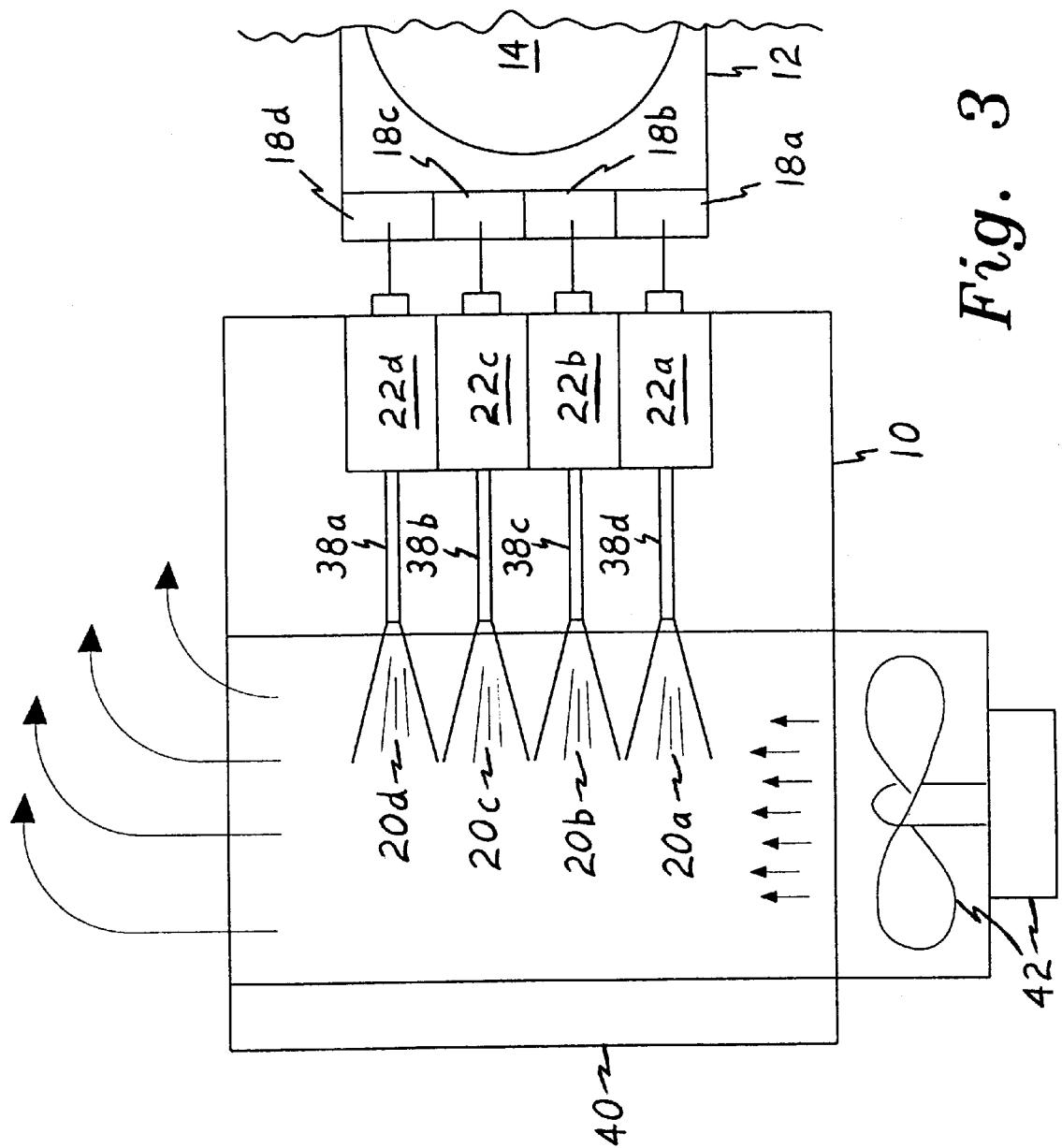
FIG. 3 is a schematic top plan view of the player and prerecorded medium assembly of the present invention, showing the dispersal of scent therefrom.

Each of the cartridges 18a through 18d (more or fewer scent cartridges may be provided, according to the prerecorded program provided) is normally sealed and contains a scent substance therein, respectively 20a through 20d (shown being dispersed in FIG. 3). The various scent substances may comprise virtually any scent desired, from food aromas, perfumes, natural scents such as the sea and pine forest, or even less pleasant odors such as burning rubber, exhaust, etc., to add realism to a movie or the like about auto racing. Such scents are readily available; one manufacturer of such scent substances is F-Matic of America Corporation, of American Fork, Utah. The products of this company are readily usable with the present invention.

Figure 2:
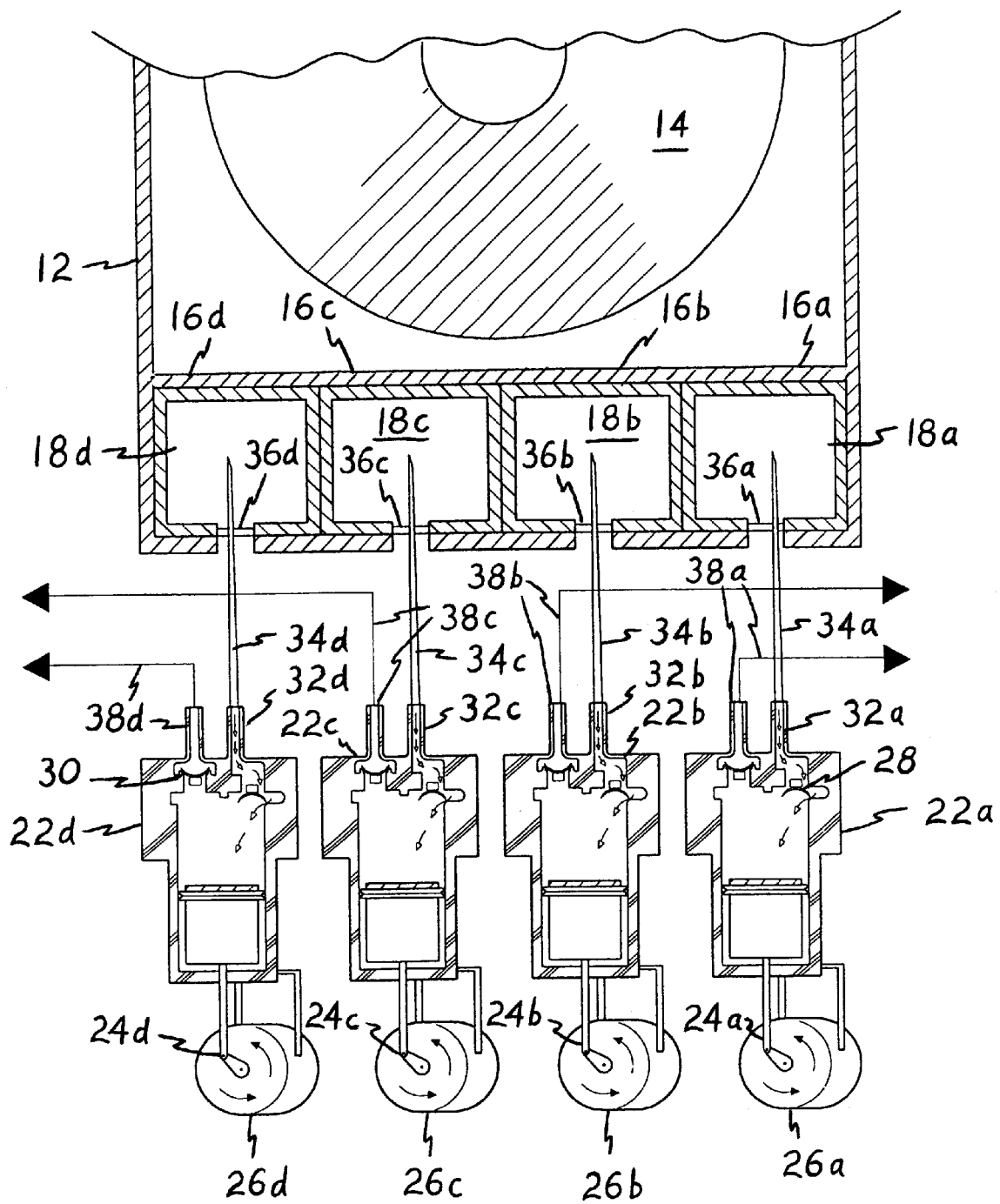
FIG. 2 is a top plan view in section of the insert and scent pumps of the player apparatus of FIG. 1, showing operational details thereof.

The playback device 10 includes at least one and preferably a series of) scent extraction device(s) therein, indicated as devices 22a through 22d in FIG. 2 of the drawings. The number of such devices provided in a given playback device depends upon the sophistication of the device and the number of different scents, smells, and odors which might be "played" during a given playing of a scent equipped recording. It will be seen that more or fewer extraction devices may be provided in a given player, with the recording including inaudible and/or invisible signals for activating any one or more of the scent extraction devices according to the program. Such inaudible and/or invisible signals are well known in prerecorded media for various other purposes (e.g., changing tracks, etc.), and are easily incorporated for the purpose of activating the scent mechanisms of the present invention.

Each of the scent extraction devices 22a through 22d comprises a small reciprocating pump in which the piston is driven by a rotary crank and connecting rod assembly, respectively 24a through 24d, by respective electric motors 26a through 26d. Each pump includes a flexible, flapper type inlet valve 28 and an outlet valve 30, with each of the inlet and outlet valves 28 and 30 being identical in each scent extraction device or pump assembly. The inlet valves 28 are automatically drawn open by the reduction in pressure within the pump cylinders when the pistons are drawn downwardly by the action of the motors and their associated crank and connecting rod linkages, while the outlet valves 30 automatically open as the pistons rise in their respective cylinders. The outlet valves 30 remain closed when the inlet valves 28 open, with the inlet valves 28 closing when the outlet valves 30 open, thus providing one way flow.

The electric motors 26a through 26d of the corresponding scent extraction devices 22a through 22d may comprise stepper motors, in which only a partial revolution may be actuated in order to cause only a partial stroke of the piston within a given scent extraction device, thus delivering a relatively small quantity of the desired scent. However, the amount of actuation of any given pump assembly is dependent upon the signal received from the recording, and is set as desired at the time of recording. It will be seen that any one or more, or all, of the pump assemblies 22a through 22d may be activated sequentially or simultaneously, as desired. Other actuating means (e.g., solenoids, etc.) may be used as desired.

The motors 26a through 26d are actuated by means of the inaudible or invisible signals provided on the prerecorded media (disc, etc.), and draw the scent substance into the cylinders of the pumps 22a through 22d from their corresponding scent cartridges 18a through 18d, with which they communicate. Each extraction assembly 22a through 22d is equipped with an inlet port, respectively 32a through 32d, which has an elongate, hollow needle, respectively 34a through 34d, extending therefrom. The needles 34a through 34d extend to contact and communicate with the corresponding scent cartridges 18a through 18d when the prerecorded cassette and scent cartridge assembly 12 is inserted into the player 10, generally as shown in FIGS. 1 and 2.

Each scent cartridge 18a through 18d has a thin, penetrable resealing membrane, respectively 36a through 36d, as shown in FIG. 2 of the drawings. (The thickness of the membranes 36a through 36d is exaggerated, for clarity in the drawing Figure.) These membranes 36a through 36d are similar to those provided in the caps of vials of antibiotics and other medicines intended for hypodermic injection, wherein a hypodermic needle (similar to the needles 34a through 34d of the scent extraction assemblies) is inserted through the membrane to withdraw the liquid within the vial as required. The thin, resilient membrane closes around the small hole made by the needle, to essentially reseal the vial. The present scent cartridges 18a through 18d, with their resealing membranes 36a through 36d and the scent extraction needles 34a through 34d, function in much the same manner.

Each pump assembly 22a through 22d includes an outlet port and line (the lines are shown schematically in FIG. 2), respectively 38a through 38d, which communicates with the internal cylinder volume of its respective pump by means of the respective outlet valves 30. Thus, when any of the scent extraction devices 22a through 22d are actuated by means of a signal from the recorded medium being played to the corresponding motor 26a through 26d, the appropriate piston(s) is/are drawn downwardly in their respective cylinder(s) to draw a quantity of the respective scent substance 20a through 20d from its/their respective cartridge(s) 18a through 18d, with the upstroke of the piston(s) ejecting the scent substance(s) 20a through 20d through the outlet port(s) and line(s) 38a through 38d and into a plenum 40 (shown in FIG. 3) for diffusion into the ambient air of the room or other area in which the present scent emitting device is located. A fan 42 (radial, "squirrel cage," etc.) is provided with the plenum 40, for further vaporizing and dispersing the scent 20a through 20d into the room.

Figure 4:
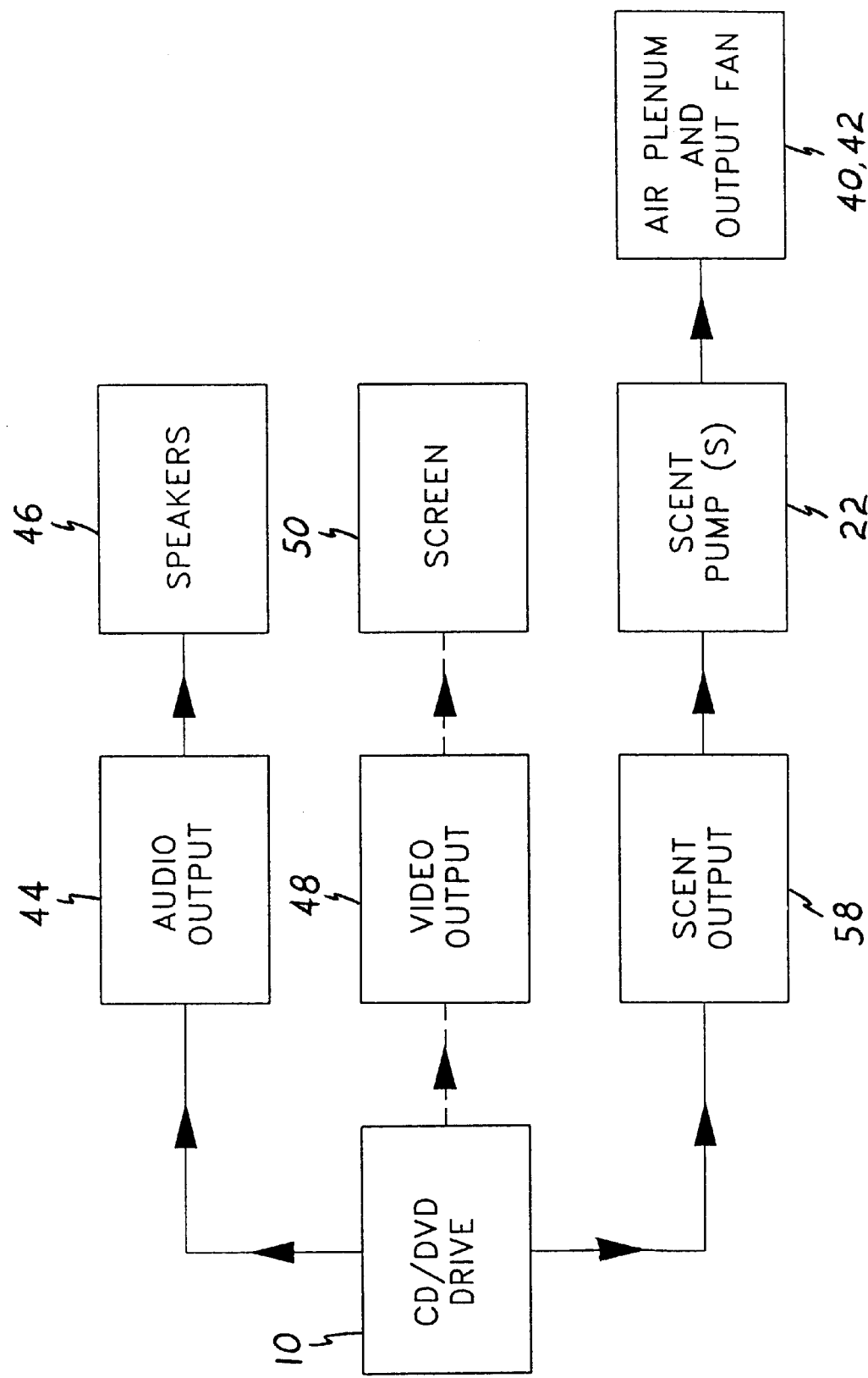
FIG. 4 is a block diagram showing the basic components of the present system and their interrelationships.

FIG. 4 provides a schematic illustration of the basic componentry of the present scent emitting device. A playback device or machine 10 (indicated as a "CD/DVD Drive" in FIG. 4, but which may comprise other types of machines for playing other types of prerecorded material) includes a conventional audio output system 44 (amplifiers, speakers 46, etc.). If the playback device is a video player of any type, then some form of video output means 48 is also provided, which provides a signal to a screen 50.

When the appropriate prerecorded medium (e.g., DVD cassette 12, etc.) is removably inserted into the corresponding playback device 10, as shown in FIG. 1 of the drawings, the needles 34a through 34d pass through the corresponding open passages 52a through 52d in the face of the cassette 12 to puncture the respective seals 36a through 36d of the scent cartridges 18a through 18d, as shown generally in FIG. 1 of the drawings. (A guard door 54, shown in broken lines in FIG. 1, may be provided over the insertion slot 56 of the player 10 in order to preclude inadvertent contact with the sharp needles 34a through 34d.)

When the prerecorded medium of the cassette 12 is activated, the player 10 plays the appropriate audio (and/or video) program, including any inaudible and/or invisible scent activation signals thereon. The scent activation signals are transmitted to the scent output system 58 (shown in the block diagram of FIG. 4) of the device, thereby activating one or more of the scent extraction pump(s) 22. The scent substance(s) 20a through 20d are drawn from the scent cartridge(s) 18a through 18d, and transmitted to the scent dispersal plenum 40 by means of the outlet line(s) 38a through 38d, whereupon they are injected into the air within the plenum 40 and diffused through the ambient air by means of the plenum fan 42. The result is an appropriately scented atmosphere for enjoying the audio or video recording or program associated with the present scent emitting device, with the total effect providing stimulus for the three senses of sight (when a video program is used), sound, and smell.

When the program is over, the prerecorded cassette 12 may be withdrawn from the player 10, as is customary with more conventional cassettes and associated players. The scent extraction devices 22a through 22d and their associated needles, inlet lines, and outlet lines may be cleared after use by inserting a cassette containing a series of scent neutralizer cartridges therein, with the cassette sending a signal to the system to activate the pump(s) 22a through 22d to flush any residual scent(s) from the system to ready it for the next program.

As such cassette recordings may be played many times over, the present invention provides for replenishment of the scent cartridge(s) 18a through 18d, merely by removing a depleted cartridge 18a through 18d from its respective compartment 16a through 16d, and inserting a fresh cartridge 18a through 18d in place of the removed cartridge. The compartments 16a through 16d are preferably coded to ensure the insertion of a correspondingly coded scent cartridge therein, in order to assure that the proper scents are provided with the accompanying program.

In summary, the present scent emitting device provides a substantial leap forward in the entertainment field, particularly in the field of prerecorded home entertainment. The present invention provides a means of achieving a much more realistic experience when enjoying a prerecorded program, particularly a movie or other video program, by stimulating the sense of smell in addition to the conventionally stimulated senses of sight and hearing.

The present invention also lends itself well to the field of advertising. It is well known that food sales increase when potential customers are treated to the aroma of the food being sold (e.g., pizza, freshly baked rolls or bread, barbecue, etc.). A short audio or video presentation relating to the specific food, supplemented by the scent emitting means of the present invention, provides stimulation for the all important sense of smell in such a situation, and will greatly increase interest on the part of consumers experiencing the presentation. In fact, the present invention need not provide audio or video output, if such is not desired. It will be seen that a recording providing only the inaudible and/or invisible signals may be played with the present machine, with no audio and video output means being provided. The resulting aroma still serves the same purpose, particularly when the present scent emitting device is located adjacent the corresponding food items in a store. Accordingly, the present scent emitting device will prove most valuable to merchants in the food industry and to others who wish to experience the ultimate in sensory stimulation in the entertainment field.

It is to be understood that the present invention is not limited to the embodiments described above, but encompasses any and all embodiments within the scope of the following claims.

I claim:

1. A scent emitting device, comprising:
   a cassette having a prerecorded playback medium and a plurality of scent cartridges, each of said plurality of scent cartridges including a scent substance;
   a playback device, for playing said prerecorded playback medium and including a plurality of scent extraction devices;
   means for removably engaging each of said plurality of scent cartridges with said plurality of scent extraction devices for withdrawing a predetermined amount of said scent substance therefrom at predetermined times when cassette is inserted into said player;
   a scent dispersal plenum communicating with said scent extraction devices, for dispersing said scent substance extracted from said scent cartridges by said scent extraction devices; and
   inaudible and invisible signal means disposed within said prerecorded playback medium for triggering actuation of said plurality of scent extraction devices, such that each of said plurality of scent cartridges is selectively and independently operated in accordance with said signal means.

2. The scent emitting device according to claim 1, further including:
   means for simultaneously withdrawing a predetermined quantity of said scent substance from any of said plurality of said scent cartridges.

3. The scent emitting device according to claim 1, wherein:
   said plurality of scent cartridges further includes a penetrable resealing membrane; and
   said plurality of extraction devices further includes a hollow needle penetrating said membrane of said plurality of scent cartridges when said cassette is inserted into said playback device, for withdrawing said scent substance from said plurality of scent cartridges therewith.

4. The scent emitting device according to claim 1, wherein:
   said plurality of said scent extraction devices are small pumps for withdrawing a quantity of said scent substance from said scent cartridges.

5. The scent emitting device according to claim 4, wherein:
   said pumps are reciprocating pumps driven by rotary crank means, and;
   inlet and outlet valve means disposed with each of said pumps.

6. The scent emitting device according to claim 4, further including:
   electric motor means for driving each of said pumps.

7. The scent emitting device according to claim 1, further including:
   fan means disposed within said plenum for dispersing said scent.

8. The scent emitting device according to claim 1, wherein:
   said prerecorded playback medium is selected from the group consisting of audio tapes, video tapes, compact audio discs and digital video discs, and;
   said playback device is selected from the group consisting of audio tape players, video tape players, compact audio disc players and digital video disc players.

9. A scent emitting device, comprising:
   a cassette having a prerecorded playback medium and at least one scent cartridge;
   a scent substance disposed within each of said at least one scent cartridge;
   a playback device, for playing said at least one prerecorded playback medium;
   at least one scent extraction device disposed within said playback device and including a small pump for withdrawing a quantity of said scent substance from said at least one scent cartridge;
   means for removably engaging said at least one scent cartridge with said at least one scent extraction device, for withdrawing a predetermined amount of said scent substance therefrom at predetermined times when said at least one cassette is inserted into said player; and
   a scent dispersal plenum communicating with said scent extraction device, for dispersing said scent substance extracted from said at least one scent cartridge by said at least one scent extraction device.

10. The scent emitting device according to claim 9, further including:
    a plurality of said scent cartridges disposed within said at least one cassette; and
    a corresponding plurality of said scent extraction devices disposed within said playback device, with each of said scent extraction devices communicating with a corresponding one of said scent cartridges.

11. The scent emitting device according to claim 10, further including:
    means for simultaneously withdrawing a predetermined quantity of said scent substance from any of said plurality of said scent cartridges.

12. The scent emitting device according to claim 9, further including:
    inaudible and invisible signal means disposed with said prerecorded playback medium for triggering actuation of said at least one scent extraction device.

13. The scent emitting device according to claim 9, wherein:
    said at least one scent cartridge further includes a penetrable resealing membrane; and
    said at least one scent extraction device further includes a hollow needle penetrating said membrane of said at least one scent cartridge when said cassette is inserted into said playback device, for withdrawing said scent substance from said at least one scent cartridge therewith.

14. The scent emitting device according to claim 9, wherein:
    said pump comprises a reciprocating pump driven by rotary crank means, and;
    inlet and outlet valve means disposed with said pump.

15. The scent emitting device according to claim 9, further including:
    electric motor means for driving said pump.

16. The scent emitting device according to claim 9, further including:
    fan means disposed within said plenum for dispersing said scent.

17. The scent emitting device according to claim 9, wherein:
    said prerecorded playback medium is selected from the group consisting of audio tapes, video tapes, compact audio discs and digital video discs, and;
    said playback device is selected from the group consisting of audio tape players, video tape players, compact audio disc players and digital video disc players.

* * * * *